Feb. 24, 1942.   C. F. M. VAN BERKEL   2,274,626
SLICING MACHINE
Filed March 10, 1939
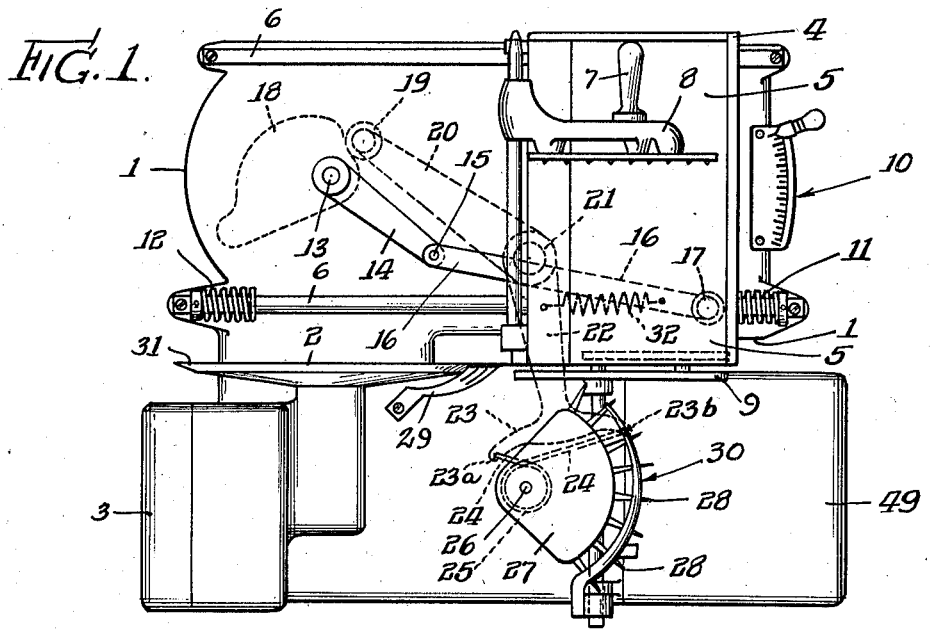
INVENTOR.
Cornelis F.M. van Berkel
BY: Cox & Moore
ATTORNEYS.

Patented Feb. 24, 1942

2,274,626

UNITED STATES PATENT OFFICE 2,274,626

SLICING MACHINE

Cornelis F. M. van Berkel, Wassenaar, Netherlands, assignor to U. S. Slicing Machine Company, La Porte, Ind., a corporation of Indiana Application March 10, 1939, Serial No. 261,126

5 Claims. (Cl. 146—94)

This invention relates to slicing machines in general and particularly to slicing machines of the so-called semi-electric, pull-push type having an electrically driven knife and a manually operated carriage.

An important object of the present invention is the provision of a semi-electric slicing machine having new and improved means for operating a slice conveyor in proper timed relationship with the movement of the carriage but which operates disproportionately with respect to the movement of the carriage in combination with a discharge fly which operates in proper timed relationship with the carriage and slice conveyor so that the slice is discharged from the conveyor at the proper time.

Another object of the invention is the provision of means for operating the discharge fly at a predetermined timed interval, the operation of which is caused by an improved mechanism which is controlled by the movement of the carriage.

A still further object of the invention is the provision of a discharge fly which is provided with a releasing mechanism for releasing the fly at a predetermined position in combination with means for causing a quick movement of the fly to discharge the slice, as well as in combination with means for returning the discharge fly to its original normal and locked position.

Numerous other objects and advantages will be apparent throughout the course and progress of the following specification.

The accompanying drawing illustrates a selected embodiment of the invention and the views therein are as follows:

Fig. 1 is a diagrammatic or schematic plan view of a slicing machine and embodying the invention;

Fig. 2 is a detail elevational view of the slice conveyor and the discharge fly; and Fig. 3 is a detail elevational view of modified means for operating and controlling the discharge fly and for causing the discharge fly to move in its discharge position at a fast rate of speed.

The particular slicing machine herein disclosed for the purpose of illustrating the invention comprises a base or frame 1 upon which there is operatively mounted a circular, rotatable knife 2 driven through any operative means by an electric motor 3. A carriage 4, having a substance table 5, is slidable manually to and fro toward and away from the knife 2. The carriage is mounted for slidable movement on guides 6, there being a handle 7 mounted on a pusher 8 to permit slidable movement of the carriage. The pusher 8 is adapted to move substance on the table 5 against a gauge plate 9. The gauge plate 9 is provided with an adjusting mechanism 10 so that the gauge plate 9 may be moved toward and away from the cutting plane so as to determine the thickness of a slice to be cut. Resilient stops 11 and 12 are positioned at the ends of the guide rods 6 to limit the extreme positions of the carriage 4. A vertical shaft 13 is mounted in the machine frame or base 1, and this shaft 13 has a crank arm 14 mounted thereon. The free end of the crank arm 14 is pivotally connected at 15 to a rod 16, the rod being also pivotally connected at 17 to the carriage 4.

The extreme positions of the crank 14, considered in the direction of movement of the carriage, are located within an angle of 180 degrees so as to eliminate all troublesome dead center positions. A cam disk 18 is secured to the shaft 13 and a roller 19 is adapted to engage the cam 18. The roller 19 is mounted on an arm 20 of a bell crank lever which is rotatable or pivotally mounted upon a part of the frame as indicated at 21. The other arm 22 of the bell crank lever terminates in a fork 23 having forked ends 23a and 23b. A belt 24 is looped about a disk 25 mounted on a vertical shaft 26, the ends of the belt being attached to the forked ends 23a and 23b. The shaft 26 is suitably mounted and supported in a part of the machine frame or base and carries a slice conveyor 27, which in plan view and in cross section is sector shaped. This conveyor 27 is provided with a superposed series of slice-receiving needles or prongs 28, which are adapted to engage and impale a slice being cut from the substance by the knife 2. A slice deflector 29 deflects a slice as it is being cut by the knife 2 into position to be engaged by the prongs on the conveyor and assists in pushing the slice well on the needles 28 so that the slice will be properly impaled. A discharge fly 30 is provided for discharging slices which are impaled on the prongs of the conveyor. The knife 2, which is preferably of the concave type, is provided with a plate 31 to prevent the substance from being pressed into the knife cavity.

In Fig. 1 the conveyor is shown as occupying a correct deflecting position, with the roller 19 located in front of a steep portion of the circumference of the cam so that when the carriage 4 is moved towards the knife the conveyor will be rapidly swung into receiving position and will occupy the correct receiving position at the required moment. Thereupon the carriage and the conveyor will move in synchronism during the picking up of the slice. Upon the return movement of the carriage the conveyor will also reach in time the correct deflecting position. The conveyor 27 is operated by the bell crank, which in turn is operated by the disk or cam 18. The roller 19 is kept into engagement with the cam disk 18 by a spring 32, which has one of its ends attached to the arm 22 of the bell crank lever and its other end attached to a part of the frame. The operation of the conveyor, therefore, is in proper timed relationship with the movement of the carriage so that the impaling position of the conveyor will be at its proper position with respect to the position of the carriage during the slicing stroke. Also the discharge position of the slice conveyor will be at the proper position with respect to the return stroke of the carriage.

The discharge fly 30 is mounted on a pivot or shaft 40 and comprises a bell crank 41 having crank arms 42 and 43. A spring 44 is connected to the arm 43 and to a part of the frame 1 and tends to pull or urge the fly 30 to the left towards the slice conveyor, Fig. 2, there being a stop 45 to limit the movement of the discharge fly in its movement to the left so that it attains a relatively vertical position. The discharge fly 30 includes a plurality of fingers 46 so arranged as to be positioned between the rows of impaling prongs 28 on the slice conveyor 27. Therefore, the prongs 28 are adapted to operate in the spaces between the spaced fingers 46. The arm 42 of the bell crank 41 is provided with an upturned end 47, Fig. 2, which is adapted to be engaged by a roller 48 on the carriage 4 when the carriage is moved from cutting position towards the operator's position. Therefore, when the carriage is moved from cutting position towards the operator, the roller 48 will engage the upturned arm or finger 47 and shift the bell crank 41 and, consequently, tilt the discharge fly to the position shown in Fig. 2, whereby a slice impaled on the prongs 28 will be discharged and placed upon a slice-receiving table 49. When the carriage is moved forward to slicing position, the roller will cease depressing the arm 47, and thereupon the spring 44 will move the discharge fly 30 to its original normal, vertical position. A disadvantage of this embodiment, however, lies in the fact that when the carriage 4 is pulled back slowly, that is, away from the cutting stroke, then the discharge fly 30 will obtain a corresponding movement, in which case the slice will not be deposited with a snap or quick action on the slice-receiving table 49. However, inasmuch as the table is moved rapidly for the slicing stroke and also on the return stroke, it has been found that the discharge fly will operate satisfactorily for practically all purposes. The discharge fly, however, may be constructed and arranged to operate with a snap action in accordance with the construction disclosed in Fig. 3.

In Fig. 3 a relatively straight bell crank arm 50 is mounted on the shaft or pivot 40, there being a rigid connection with the discharge fly 30. The discharge fly may be rigidly fixed to the shaft 40, and the crank arm 50 may likewise be rigidly fastened to the shaft, or the parts may be rigidly connected together in any suitable manner. A spring 51 is fastened to a tailpiece 52 rigidly fastened to the shaft 40 or to the bell crank 50 and tends to urge an arm 53 of the bell crank in a downward position, Fig. 3. The arm 53 of the bell crank is adapted to be engaged by a locking pawl 54 which is pivoted at 55 to a part of the slicing machine frame. A spring 56 connected to tailpiece 57 of the locking pawl 54 urges the locking pawl in a predetermined or locked position and, therefore, the discharge fly is maintained in a relatively vertical position because of the locking engagement of the pawl 54 with the extension piece 53. When the carriage is moved towards the operator, that is, away from the knife, at the completion of a cutting stroke, the roller 48 will engage an inclined surface 58 on the pawl 54 and swing the pawl on its pivot 55 against the tension of the spring 56 and release the pawl 54 from the extension 53. Thereupon the spring 51 will pull the discharge fly in a predetermined direction with a snap action and discharge any slices which are impaled on the impaling prongs 28. This snap action throws the slices in a downward direction, and it has been found in actual practice that the slices attain the same horizontal plane when landing and, therefore, are nicely stacked. The snap action by which the fly operates prevents the slices from curling or falling and they will all become neatly stacked one upon the other on the slice-receiving table 49. When the carriage is returned in a forward position, that is, towards cutting position, the roller 48 will engage an arm 59 of the bell crank and return the parts to proper position, whereupon the discharge fly will be in its normal vertical position. As the roller 48 engages the top of the arm 59, which previously has attained an inclined position, the arm 53 of the bell crank will be raised and will be snapped over the locking pawl 54, whereupon the parts will again be placed in locked position as shown in Fig. 3. The continued to and fro movement of the carriage will cause the locking pawl to be locked and unlocked to permit the operation of the discharge fly 30.

The invention provides a slicing machine which is provided with novel means for operating the slice conveyor, and the slice conveyor operates disproportionately with respect to the movement of the carriage so that the conveyor will always be in its proper position for impaling the slices and moving the impaled slices to discharge position. The discharge fly also operates in proper sequence with the operation of the carriage so that when an impaled slice is in discharge position, the discharge fly will be operated with a fast or snap movement and will throw the slice in a downward position at a relatively rapid rate of speed. By this construction the slices will all become neatly piled and stacked one upon another on top of the slice-receiving table 49.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising a base, guide rods carried by the base, a manually operated carriage mounted on said guide rods for movement thereon, means on the carriage for pushing and pulling the carriage by hand in a rectilinear path, a power driven rotary knife positioned in a plane substantially parallel to the movement of the carriage, a gauge plate positioned in a plane parallel to the slicing plane of said knife and the movement of said carriage, slice stacking mechanism, means operatively connected to the slice stacking mechanism and the carriage, said mechanism comprising a rotationally movable conveyor provided with slice engaging pins, a device adjacent the knife to press each successive slice on the pins, an operative connection between the carriage and conveyor whereby the conveyor is moved to-and-fro by the to-and-fro movement of the carriage, a discharge fly adjacent the conveyor and pivotally mounted on a part of the frame, an arm on the fly and engageable with a part on the carriage to tilt the fly, and a spring on the arm to return the fly.

2. A slicing machine comprising a power driven rotary knife, a gauge plate positioned on one side of the knife in a plane substantially parallel to the slicing plane of the knife, a manually operated carriage positioned on the side of the knife opposite the side on which the gauge plate is mounted, means on the carriage for pushing and pulling the carriage by hand in a rectilinear path and substantially parallel to the plane of the gauge plate and knife, a rotationally movable slice conveyor, an operative connection between the carriage and the conveyor whereby the conveyor is moved to-and-fro by the to-and-fro movement of the carriage, slice engaging pins on the conveyor, a device serving to press each successive slice cut by the knife on said pins, a discharge fly for discharging slices which are impaled on said pins, means for pivotally mounting the fly to a part of the slicing machine, spring means normally urging the fly toward discharge position, latch means engaging a part on the fly for holding the fly in vertical position against the tension of the spring and preventing the fly from assuming discharging position, means on the carriage and engaging a part on the latching means for releasing said latching means to permit the spring means to move the fly to discharging position, and means engaging a part of the fly to return the fly to non-discharging position and to become engaged again by the latch.

3. A power driven rotary knife, a gauge plate positioned in a plane parallel, or substantially parallel, to the slicing plane of said knife, a substance supporting carriage and means for pushing and pulling the carriage by hand along a path parallel, or substantially parallel, to the plane of the gauge plate, in combination with slice stacking mechanism comprising a rotationally movable slice conveyor which is provided with slice engaging pins, a slice discharging fly, a device serving to press each successive slice on said pins, an operative connection between the carriage and the conveyor whereby the conveyor is moved to-and-fro by the to-and-fro movement of the carriage, a discharge fly for discharging slices on said slice engaging pins, means for pivotally mounting the discharge fly adjacent the conveyor, a spring urging the discharge fly toward slice discharging position, an extension on said fly, a latch receiving said extension and holding the discharge fly in a vertical position against the tension of the spring and preventing the spring from moving the discharge fly to discharge position, means on the carriage adapted to engage the latch means when the conveyor has moved the slices to discharge position to release said latching means whereby the spring will pull the discharge fly to discharging position and discharge slices impaled on the conveyor, a rigid finger on the discharge fly and adapted to be engaged by the means on the carriage to return the fly to normal upright position, and spring means for returning the latch to normal position to again engage the extension and maintain the discharge fly in vertical position.

4. In a slicing machine of the manually operable push-pull type having a power driven rotary knife, a substance carriage reciprocable with respect to said knife through varying degrees of cutting and return movement by pushing and pulling the carriage by hand, means for feeding predetermined thicknesses of slice for cutting by said knife, oscillating rotary conveyor means for receiving cut slices and conveying them to a discharge position remote from said knife, and means operable by movement of said carriage for oscillating said rotary conveyor means and effecting rotation thereof at an accelerated rate with respect to movement of the carriage during a portion of its oscillatory movement in each direction, the combination of a discharge fly positioned adjacent said conveyor at said discharge position and pivotally mounted on a portion of the slicing machine, an arm on said fly and engageable with a part on the carriage to tilt the fly, and a spring on the arm to return the fly.

5. In a slicing machine of the manually operable push-pull type having a power driven rotary knife, a substance carriage reciprocable with respect to said knife through varying degrees of cutting and return movement by pushing and pulling the carriage by hand, means for feeding predetermined thicknesses of slice for cutting by said knife, oscillating rotary conveyor means for receiving cut slices and conveying them to a discharge position remote from said knife, and means operable by movement of said carriage for oscillating said rotary conveyor means and effecting rotation thereof at an accelerated rate with respect to movement of the carriage during a portion of its oscillatory movement in each direction, the combination of a discharge fly for discharging slices from said conveyor, means for pivotally mounting the fly to a part of the slicing machine, spring means normally urging the fly toward discharge position, latch means engaging a part on the fly for holding the fly in vertical position against the tension of the spring and preventing the fly from assuming discharging position, means on the carriage and engaging a part on the latching means for releasing said latching means to permit the spring means to move the fly to discharging position, and means engaging a part of the fly to return the fly to non-discharging position and to become engaged again by the latch.

CORNELIS F. M. van BERKEL.